United States Patent [19]
Frano et al.

[11] Patent Number: 5,186,572
[45] Date of Patent: Feb. 16, 1993

[54] END CONNECTOR FOR TUBING

[75] Inventors: Francis G. Frano, Hoffman Estates; Nelson D. McIlveen, Oak Forest, both of Ill.

[73] Assignee: Illinois Tool Works Inc., Glenview, Ill.

[21] Appl. No.: 822,356

[22] Filed: Jan. 17, 1992

[51] Int. Cl.⁵ ................................................ B25G 3/00
[52] U.S. Cl. .................................. 403/251; 403/248; 403/277
[58] Field of Search .................. 24/300; 403/277, 248, 403/251

[56] References Cited
U.S. PATENT DOCUMENTS 1,638,003 8/1927 Neumann ..................... 403/248 X
4,559,677 12/1985 Tracy ............................... 24/300

Primary Examiner—Andrew V. Kundrat
Attorney, Agent, or Firm—Schwartz & Weinrieb

[57] ABSTRACT

An end connector for attachment to a tubing end including a housing having a first aperture therethrough with a predetermined internal periphery and a plug member having a predetermined external periphery for cooperative engagement with the end of the tubing and the internal periphery of the first aperture of the housing, the plug member releasably retaining a portion of the end of the tubing between the external periphery of the plug member and the internal periphery of the first aperture of the housing to prevent removal of the tubing from the housing when the tubing is subjected to tension in a desired direction.

20 Claims, 1 Drawing Sheet

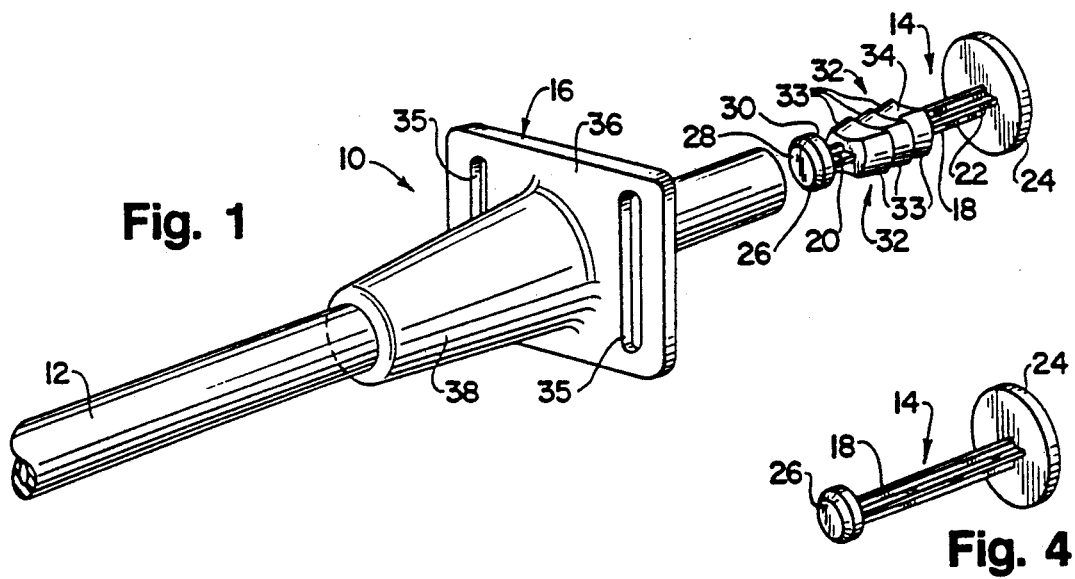
Fig. 1
Fig. 4
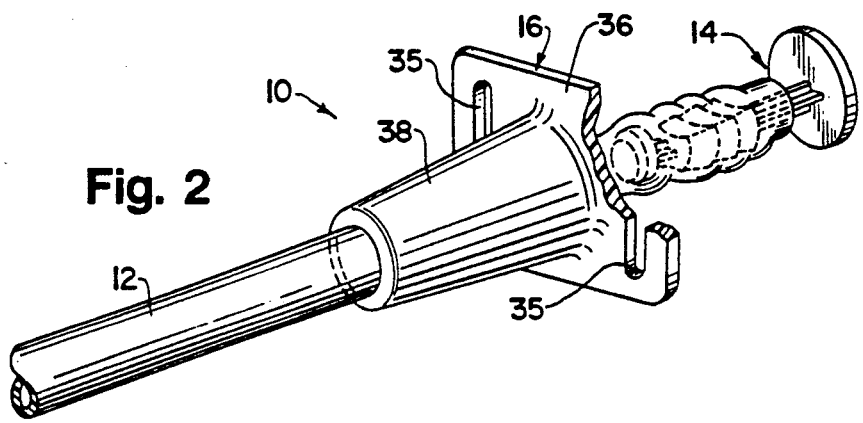
Fig. 2
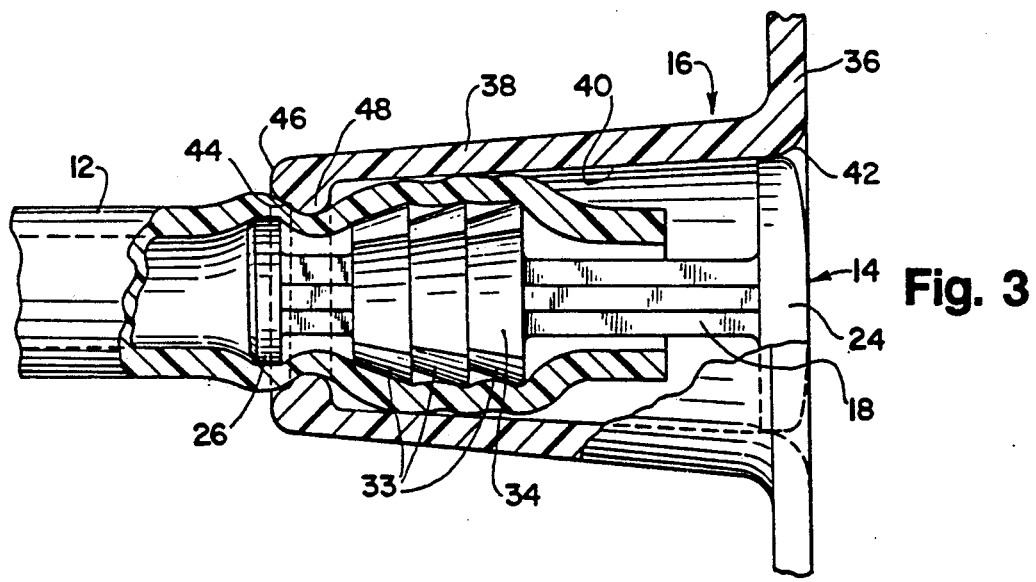
Fig. 3

END CONNECTOR FOR TUBING

BACKGROUND OF THE INVENTION

1. Field of the Invention

This invention relates generally to an end connector, and more particularly to an end connector for attachment to an end of flexible tubing which releasably retains the end of the tubing and readily can be secured to another member.

2. Description of the Related Art

A tubing end typically is connected to another object by inserting a male connecting member within the interior of the tubing and tightening an adjustable clamp or similar article about the periphery of the tubing portion surrounding the male connector member. This type of connection, however, does not provide adequate retention of the free end of the tubing when the tubing is in tension with respect to the male connecting member. Additionally, if the clamp has sharp edges or is over-tightened, the clamp can cut into the tubing causing the tubing to break free.

One application where tubing members are subjected to tension is with exercise cords or "sport cords." These cords typically utilize a piece of flexible rubber tubing having a desired length which is repeatedly stretched by a user to provide progressive resistance exercise for various parts of the body. To change the level of tension provided by such cords, the tubing size, shape and material can be adjusted as desired.

To assist in gripping the ends of such cords, a handle typically is attached to each end as described above where each handle is provided with a male connector member which is inserted within the interior of the end of the tubing and a clamp is tightened about the end of the tubing surrounding the male connector member. This type of connection, however, does not effectively retain the tubing end during tension and is subject to failure as described above which can be harmful since the flexible rubber tubing tends to recoil upon failure.

It therefore is desirable to provide an end connector for a tubing end which releasably retains the end of the tubing against significant tensile forces without damaging the tubing and where the end connector with the tubing attached can be secured to another member, such as a handle or a stationary object, to facilitate use of the tubing member for any desired purpose.

SUMMARY OF THE INVENTION

The invention provides an end connector for attachment to a tubing end. The end connector includes a housing having a first aperture therethrough with a predetermined internal periphery. A plug member also is provided having a predetermined external periphery for cooperative engagement with the end of the tubing and the internal periphery of the first aperture of the housing where the plug member releasably retains a portion of the end of the tubing between the external periphery of the plug member and the internal periphery of the first aperture of the housing to prevent removal of the tubing from the housing when the tubing is subjected to tension in a desired direction.

BRIEF DESCRIPTION OF THE DRAWINGS

Various objects, features, and attendant advantages of the present invention will become better understood from the following detailed description, when considered in connection with the accompanying drawings in which like reference characters designate like or corresponding parts throughout the several views, and wherein:

FIG. 1 is a perspective exploded view of the end connector of the invention illustrated with an end of a length of rubber tubing;

FIG. 2 is a perspective partially exploded view of the end connector of FIG. 1 illustrating the plug member installed within the tubing;

FIG. 3 is a longitudinal cross-sectional view of the end connector and tubing of FIG. 1 illustrating the end connector assembled to the tubing end; and FIG. 4 is a perspective view of another embodiment of the plug member of the end connector of the invention.

DESCRIPTION OF THE PREFERRED EMBODIMENTS

Referring to FIG. 1, the end connector of the invention is designated generally by the reference numeral 10. The end connector 10 typically is utilized with a piece of tubing 12 and includes two pieces, a plug 14 and a housing 16. Preferably, the plug 14 and housing 16 are formed from plastic, but the particular material can vary.

The tubing 12 preferably is a hollow piece of flexible rubber tubing, circular in oross-section, with a predetermined wall thickness and inside and outside diameters selected for cooperative engagement with the end connector 10 as will be described below. The particular size, shape and material of the tubing 12 can vary.

The plug 14 includes an elongate stem 18 having a first tubing engagement end 20 and a second end 22. The particular cross-sectional configuration of the stem 18 can vary, but to provide increased strength, the cross-sectional configuration of the stem 18 preferably is substantially similar to a plus sign (+).

The second end 22 is formed with a circular head 24 having a predetermined thickness and diameter. Preferably, the diameter of the head 24 is selected to be somewhat larger than the outer periphery of the stem 18 and, as will be described below, serves to cap a portion of the housing 16.

The first tubing engagement end 20 includes a circular shoulder or flange 26 for insertion within the interior of the tubing 12. The shoulder 26 preferably includes a front side 28 and a back side 30. To assist in insertion of the first end 20 within the tubing 12, the width of the shoulder 26 preferably is tapered from the wider back side 30 toward the narrower front side 28. To further assist in insertion ahd reduce damage to the tubing 12, the edges of both the head 24 and shoulder 26 can be radiused or rounded, if desired. Additionally, the particular size and shape of the head 24 and shoulder 26 can vary.

Briefly, in use the first tubing engagement end 20 of the plug 14 is inserted within the interior of the tubin 12 and is held therein by frictional engagement. To provide such frictional engagement, the inside diameter of the tubing 12 is slightly less than the outside periphery or diameter of the shoulder 26 of the first end 20 of the plug 14. Thus, the tubing 12 is stretched over the shoulder 26 during insertion and thereafter contracts and is retained on the plug 14. The plug 14 with attached tubing 12 then is inserted and retained within the housing 16 as will be explained below. To assist in inserting and sliding the plug 14 within the tubing 12, a solvent or lubricant (not illustrated) can be utilized. The solvent preferably evaporates after assembly to assist in anchoring the plug 14 to the tubing 12 without slippage.

As FIG. 1 illustrates, the stem 18 can be formed with two sets of barbs 32, one each positioned on opposite sides of the length of the stem 18. Each set of barbs 32 preferably contains three tapered barbs 33 sequentially positioned one after another along the stem 18.

It is to be understood that the particular number, shape and dimensions of the barbs 33 as well as the spacing between each barb 33 and each set of barbs 32 can vary and can be selected to vary the amount of force necessary to insert and remove the plug 14 from the tubing 12. Additionally, the end connector 10 can be utilized with only one set of barbs 32 where each barb 33 extends about the entire periphery of the stem 18 or only a predetermined portion of the periphery of the stem 18 (not illustrated.)

To assist in gripping the plug 14 during insertion and removal of the plug 14 from the tubing 12, indented longitudinal relieved portions or finger paths 34 are formed on opposite sides of the stem 18 between the two sets of barbs 32. The finger paths 34 are rounded or radiused and dimensioned to accommodate the shape of a user's finger. After assembly to the tubing 12, the tubing 12 spans the finger paths 34 between the sets of barbs 32. Thus, after insertion of the plug 14 within the tubing 12, any solvent remaining within the tubing 12 can flow out of the tubing 12 between the space formed between the tubing 12 and the finger paths 34. Additionally, air can enter into the tubing 12 along the finger paths 34 to assist in evaporation of any remaining solvent and to permit the tubing 12 to breathe.

The housing 16 includes a base portion 36 and a conical portion 38 integrally formed with and extending outwardly away from one side of the base portion 36. Preferably, the base portion 36 is utilized as a yoke and includes two slotted apertures 35, one each on either side of the conical portion 38, for attachment of a handle, harness or the like.

As FIG. 3 illustrates, the conical portion 38 preferably is hollow, thereby forming an interior, circular, tapered channel 40 therethrough. The channel 40 includes a first end forming an enlarged diameter aperture 42 extending through the base portion 36 and a second reduced diameter aperture 44 extending through an opposite distal end 46 of the conical portion 38. Preferably, to reduce the risk of any damage to the tubing 12, the edges of both apertures 42 and 44 are rounded.

To assist in engaging the tubing 12 within the housing 16, the tapered channel 40 includes an inwardly extending annular rib 48 formed proximate the distal end 46. The rib 48 reduces the inside diameter of the aperture 44 of the channel 40 so that it is slightly greater than the external or outside diameter of the shoulder 26 but less than the outside edge of the barbs 33 of the plug 14. Thus, the shoulder 26 without the tubing 12 can extend through the channel 40 past the rib 48 but the barbs 33 cannot.

The tubing 12 has a predetermined thickness and external diameter selected so that the tubing 12 without the plug 14 can extend through the channel 40 past the rib 48. When the shoulder 26 is inserted within the tubing 12, however, the external diameter of the tubing 12 about the shoulder 26 is slightly greater than the diameter of the channel 40 at the position of the rib 48. Thus, the shoulder 26 with the tubing 12 thereabout cannot readily extend through the channel 40 past the rib 48.

When the tubing 12 is pulled to the left with respect to FIG. 3, the tubing 12 engages the rib 48 and deforms or compresses slightly about the shoulder 26. This compression allows the tubing 12 and shoulder 26 to pass over the rib 48 with an audible click providing a detent or catch with a positive indication that can be felt by a user.

In this position, the rib 48 is seated behind the back side 30 of the shoulder 26 between the shoulder 26 and the barbs 33 which prevent further movement of the plug 14 to the left in FIG. 3. The tubing 12 thereby is captured between the shoulder 26, the rib 48 and the barbs 33 and cannot be removed upon a significant tension or pulling force to the left. At the same time, the head 24 of the plug 14 is fitted slightly within the tapered channel 40 and serves to cap the larger aperture 42 on the base portion 36 of the housing 16. Additionally, this engagement provides a strain relief for the frictional engagement between the barbs 33 and the tubing 12.

As FIG. 1 illustrates, to assemble the end connector 10, an end of the tubing 12 is inserted through the apertures 44 and 42 of the conical portion 38 of the housing 16. The internal surface of the tubing 12 or the plug 14 then is lubricated with a solvent (not illustrated) and the shoulder 26 of the first end 20 of plug 14 is inserted within the interior of the tubing 12, preferably until all of the barbs 33 are within the interior of the tubing 12 as illustrated in FIG. 2. Next, any excess solvent can be drained out of the tubing 12 along the finger paths 34 by either squeezing the tubing 12 or tilting the tubing 12 and the attached plug 14. Finally, the tubing 12 is pulled to the left with respect to FIGS. 1-3 until the shoulder 26 and surrounding portion of the tubing 12 pass over the rib 48 and the desired detent position is achieved as illustrated in FIG. 3 with the head 24 capping the larger aperture 42 of the housing 16.

To disassemble the end connector 10, the shoulder 26 is pushed, or the head 24 is pulled, to the right in FIG. 3 with sufficient force to enable the shoulder 26 and surrounding portion of tubing 12 to pass back over the rib 48. Thereafter the plug 14 can be removed from the tubing 12, with or without the use of a solvent.

FIG. 4 illustrates another embodiment of the plug 14 which is formed with only the stem 18, head 24 and shoulder 26 where the shoulder 26 alone maintains frictional engagement with the tubing 12. In this embodiment of the plug 14, to prevent further movement of the plug 14 through the aperture 44, the head 24 engages the interior of the tapered channel 40. The remaining portions of the plug 14 and housing 16 function similar to that of the embodiment of FIGS. 1-3.

Preferably, the end connector 10 is utilized with a sport cord as described above where an end connector 10 is affixed to both opposite ends of a length of tubing 12 and the housing 16 includes a handle (not illustrated) attached to the slotted apertures 35. The handles are grasped by a user and the tubing 12 is stretched to provide the desired progressive resistance exercise, the resistance being provided by the flexibility of the tubing 12 which typically increases with increased pulling by the user.

Thus, due to the releasable design of the end connector 10, the tubing 12 readily can be interchanged with another piece of tubing (not illustrated) having a different material, shape or the like which provides increased or decreased resistance during stretching. This enables different users to start at or substitute different levels of resistance as desired.

Modifications and variations of the present invention are possible in light of the above teachings. For example, the end connector 10 can be utilized without the rib 48, with a variety of different tubing 12 and in applications other than a sport cord. It is therefore to be understood that within the scope of the appended claims, the invention may be practiced otherwise than as specifically described.

What is claimed and desired to be secured by Letters Patent is:

1. An end connector for attachment to an end portion of a tubing member, comprising:

a housing having a through-bore defined therethrough which has a predetermined inner diameter, a first aperture defined within a first end portion of said housing and in communication with said through-bore of said housing, an annular rib defined within the vicinity of said first aperture of said housing and projecting radially inwardly with respect to said first aperture of said housing and with respect to said through-bore of said housing such that the inner diametrical extent defined by said annular rib is less than said predetermined inner diameter of said through-bore of said housing, and a second aperture having a predetermined diametrical extent defined within a second end portion of said housing; and plug means having a predetermined external diametrical extent which is less than said predetermined diametrical extent of said second aperture of said housing and said predetermined inner diameter of said through-bore of said housing, but greater than said inner diametrical extent of said annular rib, so as to be insertable through said second aperture of said housing and movable within said through-bore of said housing until said plug means encounters said annular rib of said housing for cooperative engagement with said annular rib of said housing for releasably retaining said end portion of said tubing member between said plug means and said annular rib of said housing so as to prevent removal of said end portion of said tubing member from said housing when said tubing member is subjected to a tensile force in a predetermined direction.

2. The end connector as defined in claim 1 wherein said annular rib is positioned about the internal periphery of said first aperture for engaging the tubing and said plug means and providing a positive detent which can be felt by a user to ensure seating of said plug means within said first aperture of said housing.

3. The end connector as defined in claim 1 wherein said plug means include an elongate rod having a predetermined length, a first tubing engagement end and a second opposite end formed with a head, said first end including a shoulder thereon forming a predetermined external periphery for frictional engagement with an internal surface of the tubing, the external periphery of said shoulder being less than the interior periphery of said first aperture, the tubing having a predetermined wall thickness and an external periphery less than the interior periphery of said first aperture so that when an end of the tubing is threaded through said first aperture and said shoulder is inserted within the tubing the shoulder and the tubing thereabout cannot pass through said first aperture without deformation of the tubing.

4. The end connector as defined in claim 3 wherein said elongate rod of said plug means includes a plurality of barbs sequentially positioned along its length, each barb extending about the entire external periphery of said rod for increased gripping of the internal surface of the tubing.

5. The end connector as defined in claim 3 wherein said elongate rod of said plug means includes at least one set of barbs sequentially positioned along its length, each barb extending about a predetermined portion of the external periphery of said rod for increased gripping of the internal surface of the tubing.

6. The end connector as defined in claim 5 including two sets of barbs, one each positioned along opposite sides of the length of said elongate rod with relieved portions therebetween, said barbs in each set being sequentially positioned along the length of said rod and only extending about a predetermined portion of said periphery of said rod to provide said relieved portions and increased gripping of the internal surface of the tubing while enabling removal of any matter within the tubing along said relieved portions between said sets of barbs.

7. The end connector as defined in claim 6 wherein said relieved portions of the external periphery of said elongate rod between said sets of barbs are dimensioned to provide finger path means for assisting a user in gripping said plug means and for enabling removal of any matter within the tubing after said plug means are engaged within the tubing.

8. The end connector as defined in claim 1 wherein said housing includes a base portion and a hollow conical portion having a first end integrally formed with and extending from one side of said base portion and said second aperture extendsng through said first end and said base portion, said conical portion including an interior channel defining said throughbore extending therethrough and tapering away from said first end to a second end of said conical portion having said first aperture therethrough, said plug means and the end of tubing being contained wit hin said channel of said housing after assembly.

9. The end connector as defined in claim 8 wherein said annular rib is positioned about the internal periphery of said first aperture for engaging the tubing and said plug means and providing a positive detent which can be felt by a user to ensure seating of said plug means within said first aperture of said housing.

10. The end connector as defined in claim 9 wherein said housing includes attachment means for connecting said housing to another member.

11. An end connector for attachment to an end portion of a tubing member, comprising:

a housing having a tapered through-bore defined therethrough which has an inner peripheral surface, a first aperture defined within a first end portion of said housing and in communication with the samller diameter portion of said tapered throughbore of said housing, an annular rib defined within the vicinity of said first aperture of said housing and projecting radially inwardly with respect to said first aperture of said housing and with respect to said tapered through-bore of said housign such that the inner diametrical extent defined by said annular rib is less than the diametrical extent of said smaller diameter portion of said tapered throughbore of said housing, and a second aperture defined within a second end portion of said housing and in communication with the larger diameter portion of said tapered through-bore of said housing; and plug means having a first end portion thereof insertable through said second aperture of said housing and movable within said tapered through-bore of said housing so as to be disposed at an axial position with respect to said housing at which said first end portion of said plug means operatively cooperates with said annular rib of said housing for releasably retaining said end portion of said tubing member between said first end portion of said plug means and said annular rib of said housing so as to prevent removal of said end portion of said tubing member from said housing when said tubing member is subjected to a tensile force in a predetermined direction, and a second end portion thereof insertable through said second aperture of said housing and engageable with said inner peripheral surface of said tapered through-bore of said housing within the vicinity of said second aperture of said housing so as to limit axial movement of said plug means, and said first end portion thereof, within said tapered through-bore of said housing and thereby pre-define said axial position at which said first end portion of said plug means operatively cooperates with said annular rib of said housing for releasably retaining said end portion of said tubing member between said first end portion of said plug means and said annular rib of said housing so as to prevent removal of said end portion of said tubing member from said housing when said tubing member is subjected to said tensile force in said predetermined direction.

12. An end connector as set forth in claim 11, wherein:
said plug means comprises an elongated stem portion;
said first end portion of said plug means comprises a disc-shaped shoulder portion formed upon one end of said elongated stem portion; and
said second end portion of said plug means comprises a disc-shaped head portion formed upon a second opposite end of said elongated stem portion.

13. An end connector as set forth in claim 12, wherein:
said disc-shaped shoulder portion of said plug means has an external diametrical extent which is less than said inner diametrical extent of said annular rib, and said end portion of said tubing member, within which said disc-shaped shoulder portion of said plug means is disposed when said end portion of said tubing member is to be retained within said housing as a result of said operative cooperation defined between said disc-shaped shoulder portion of said plug means and said annular rib of said housing, has a predetermined wall thickness such that the external diametrical extent of said disc-shaped shoulder portion and said end portion of said tubing member disposed thereover is greater than said inner diametrical extent of said annular rib such that when said tubing member is subjected to said tensile force in said predetermined direction, said end portion of said tubing member disposed over said disc-shaped shoulder portion of said plug means is compressed and deformed such that said disc-shaped shoulder portion of said plug means and said end portion of said tubing member disposed thereover can pass beyond said annular rib of said housing in said predetermined direction of said tensile force in an audible detent indicating mode.

14. An end connector as set forth in claim 12, wherein:
said elongated stem portion has a cross-sectional configuration which is substantially that of a plus (+) sign.

15. An end connector as set forth in claim 3, wherein:
said elongate rod has a cross-sectional configuration which is substantially that of a plus (+) sign.

16. An end connector for attachment to an end portion of a tubing member, comprising:
a housing having a through-bore defined therethrough which has a predetermined inner diameter, a first aperture defined within a first end portion of said housing and in communication with said through-bore of said housing, an annular rib defined within the vicinity of said first aperture of said housing and projecting radially inwardly with respect to said first aperture of said housing and with respect to said through-bore of said housing such that the inner diametrical extent defined bys aid annular rib is less than said predetermined inner diameter of said through-bore of said housing, and a second aperture having a predetermined diametrical extent defined within a second end portion of said housing; and plug means having shoulder means and axially spaced barb means for disposition internally within said end portion of said tubing member which has a predetermined wall thickness, said shoulder means having an external diametrical extent which is less than said predetermined diametrical extent of said second aperture, said predetermined inner diameter of said through-bore, and said inner diametrical extent of said annular rib of said housing, whereas when said shoulder means is disposed internally within said end portion of said tubing member, the external diametrical extent of said shoulder means and said end portion of said tubing member disposed thereover is greater than said inner diametrical extent of said annular rib of said housing, and said barb means has an external diametrical extent which is less than said predetermined diametrical extent of said second aperture of said housing and said predetermined inner diameter of said through-bore of said housing, but which is greater than said inner diametrical extent of said annular rib of said housing, whereby said shoulder means and said barb means are insertable through said second aperture of siad housing and movable within said through-bore of said housing until said shoulder means and said end portion of said tubing member disposed thereover encounter said annular rib of said housing whereupon said tubing member being subjected to a tensile force in a predetermined direction, said end portion of said tubing member disposed over said shoulder means will be compressed and deformed as a result of encountering said annular rib of said housing such that said shoulder means and said end portion of said tubing member disposed thereover can pass beyond said annular rib of said housing in said predetermined direction of said tnesile force whereby said shoulder means will operatively engage one side portion of said annular rib while said barb means will operatively engage a second opposite side portion of said annular rib so as to securely trap a portion of said end portion of said tubing member between said shoulder means, said annular rib of said housing, and said barb means and thereby releasably retain said end portion of said tubing member within said connector so as to prevent removal of said end portion of said tubing member from said housing when said tubing member is subjected to said tensile force in said predetermined direction.

17. An end connector as set forth in claim 16, wherein:
said shoulder means is disposed upon a first end portion of an elongated stem of said plug means;
said barb means is disposed upon an intermediate portion of said elongated stem; and
a head portion is disposed upon a second opposite end portion of said elongated stem for closing said second aperture of said housing when said shoulder means and said barb means operatively cooperate with said annular rib of said housing to securely trap said end portion of said tubing member therebetween.

18. An end connector as set forth in claim 17, wherein:
said elongated stem has a cross-sectional configuration which is substantially that of a plus (+) sign.

19. An end connector as set forth in claim 16, wherein:
said barb means comprises a set of three axially spaced barbs.

20. An end connector as set forth in claim 17, wherein:
said barb means comprises two sets of circumferentially spaced barbs disposed upon said elongated stem; and
finger-gripping relief portions are provided upon said elongated stem between said sets of barbs for assisting a user to grip said plug means.

* * * * *